United States Patent
Carter

[11] Patent Number: 5,851,002
[45] Date of Patent: Dec. 22, 1998

[54] TRI-STABLE SOLENOID-OPERATED VALVE

[75] Inventor: Stephen Carter, Ontario, Canada

[73] Assignee: Ortech Corporation, Mississauga, Canada

[21] Appl. No.: 692,693

[22] Filed: Aug. 6, 1996

Related U.S. Application Data

[60] Provisional application No. 60/002,000 Aug. 7, 1995.
[51] Int. Cl.⁶ .................................................. F16K 31/06
[52] U.S. Cl. ........................................ 251/121; 251/129.1
[58] Field of Search ........................... 251/129.08, 129.1, 251/120, 121

[56] References Cited

U.S. PATENT DOCUMENTS

| | | | |
|---|---|---|---|
| 3,190,608 | 6/1965 | Hassa | 251/129.1 X |
| 5,441,232 | 8/1995 | Tanaka | 251/129.1 X |

FOREIGN PATENT DOCUMENTS 226488  3/1963  Austria .

*Primary Examiner*—Stephen M. Hepperle
*Attorney, Agent, or Firm*—Shoemaker and Mattare, Ltd.

[57] ABSTRACT

A tri-stable, solenoid-operated valve defines an internal chamber communicating with an outlet passageway and an inlet passageway, with a valve seat surrounding the outlet passageway. A first piston reciprocates toward and away from the valve seat and supports a closure adapted to close the valve when the first piston is in a first position, and to be spaced away from the valve when the first piston is in a second position. A second piston is mounted to the first piston and can reciprocate toward and away from the valve seat. The second piston has a portion which projects into the outlet causing partial occlusion when the first piston is in its second position and the second piston is in its first position. The portion of the second position causing the outlet to be occluded is substantially withdrawn when both pistons are at their respective second positions.

6 Claims, 2 Drawing Sheets

TRI-STABLE SOLENOID-OPERATED VALVE

This application is a provisional of U.S. Ser. No. 60/002,000, filed Aug. 7, 1995.

This invention relates generally to tri-stable solenoids, by which three distinct flow rates are provided.

BACKGROUND OF THIS INVENTION

Although solenoids are already known that provide three or more stable positions, each corresponding to a particular percentage of the "fully open" rate, there is a need for simplification in such solenoids in order to reduce manufacturing costs and to increase reliability.

GENERAL DESCRIPTION OF THIS INVENTION

It is an object of one aspect of this invention to provide a tri-stable solenoid operated valve which is reliable and of simplified construction.

It is an object of a further aspect of this invention to provide a tri-stable solenoid, which is designed such that, given an unchanging fluid pressure upstream of the valve, the aperture through which the fluid flows is consistent in its partial restriction of the flow, whereby a high degree of reproducibility is attained.

More particularly, this invention provides a tri-stable, solenoid-operated valve, comprising: a) body means defining an internal chamber, b) an outlet passageway leading away from the chamber, c) a valve seat surrounding the outlet passageway, d) a primary piston mounted within the chamber for reciprocating movement toward and away from said valve seat, between a first and a second position, at least part of said primary piston being of a ferro-magnetic material, e) closure means supported by said primary piston, the closure means being adapted to close against said valve seat when the primary piston is at said first position, and to be spaced away from the valve seat when the primary piston is at its second position, f) an inlet passageway opening into said chamber such that it is denied communication with said outlet passageway when the primary piston is at its first position, and is in communication with said outlet passageway when the primary piston is at its second position, g) a secondary piston mounted to the primary piston for reciprocating movement with respect thereto between a first and a second position, the secondary piston having a portion which projects into the outlet passageway to cause the outlet passageway to be occluded to a predetermined degree when the primary piston is at its second position and the secondary piston is at its first position; said portion of said secondary piston causing the outlet passageway to be occluded to a degree less than said predetermined degree when both the primary and secondary pistons are at their respective second positions, at least part of said secondary piston being of a ferro-magnetic material, h) biasing means urging both said pistons toward their respective first positions, i) solenoid means which, when energized to a first predetermined level, overcomes said biassing means to move both pistons to their respective second positions, and which, when energized to a second predetermined level lower than said first predetermined level, partly overcomes said biassing means to move only the primary piston to its second position, while leaving the secondary piston in its first position, whereby the lower energization of said solenoid means causes the valve to be opened to a degree intermediate between closure and that achieved by the first level of energization.

GENERAL DESCRIPTION OF THE DRAWINGS

One embodiment of this invention is illustrated in the accompanying drawing, in which like numerals denote like parts throughout the several views, and of which FIGS. 1, 2 and 3 represent respectively the fully closed, the partially open and the fully open condition of the valve, all views showing the valve in axial section.

DETAILED DESCRIPTION OF THE DRAWINGS

Figure 1:
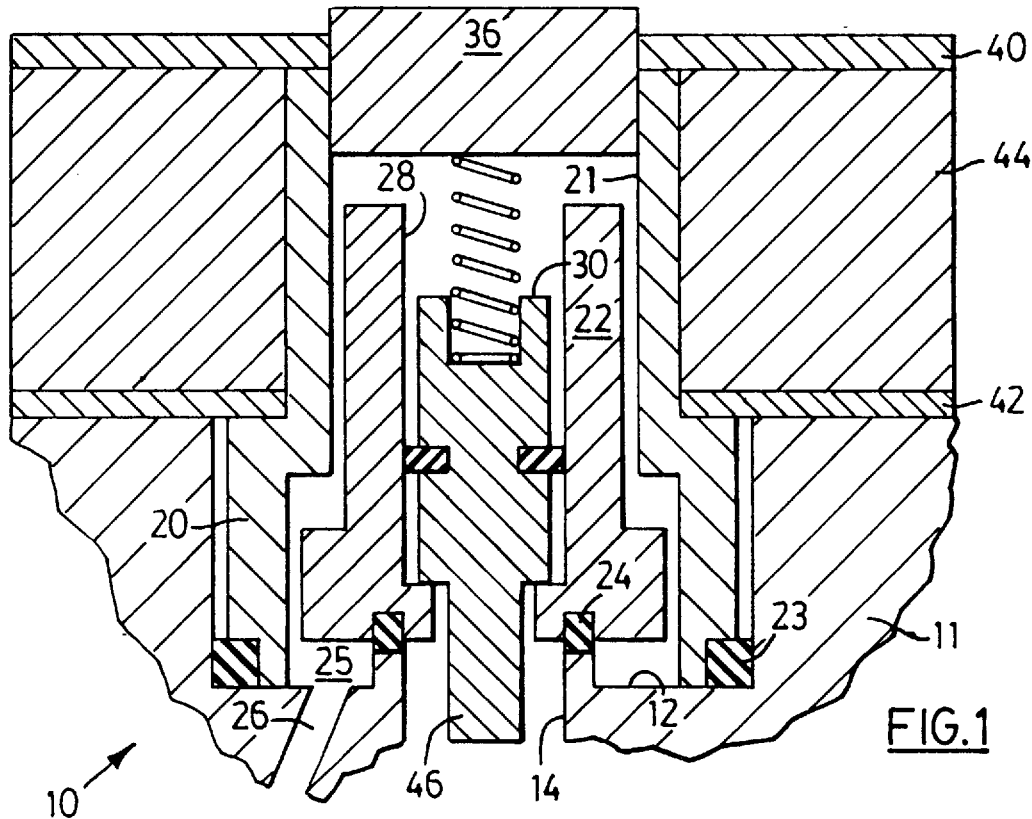

The drawings illustrate a tri-stable solenoid-operated valve shown generally at the numeral 10, the valve 10 including a body 11 (only partly shown in the drawings), the body 11 defining an internal recess 12. As can be seen, an outlet passageway 14 communicates with and leads away from the recess 12, with a valve seat 16 surrounding the outlet passageway 14.

A piston guide 20 is fixedly lodged within the recess 12 and defines a cylindrical internal guideway 21 for a primary piston 22 which is adapted to undergo vertical reciprocating movement toward and away from the valve seat 16, between a lower first position and a higher second position. An annular seal 23 is compressed into the lower outer corner of the recess 12 by the lower portion of the piston guide 20, the latter exhibiting an annular groove for receiving part of the seal 23. The seal 23 thus prevents escape of fluid into the space between the recess 12 and the piston guide 20.

Together, the body 10 and the piston guide 20 define an internal chamber 25 through which a fluid material can pass when the valve is fully or partially open.

FIG. 1 shows the primary piston 22 in its lower first position. It will be noted that the primary piston 22 supports closure means in the form of an annular ring seal 24 which is sized and positioned to fully close against the valve seat 16 when the primary piston 22 is in its lowest position (this being its first position).

It will be noted further than an inlet passageway 26 opens into the chamber 25 such that it is denied communication with the outlet passageway 14 when the primary piston 22 is in its first or lowermost position.

In the illustrated embodiment, the primary piston 22 provides an internal guideway 28 along which a secondary piston 30 is adapted to slide, the guideway 28 being substantially cylindrical, as is the secondary piston 30, the latter having a sealing ring 32 which spaces it away from the guideway 28, at the same time sealing the space above the ring 32 from the space below the ring. If desired, a further sealing ring, spaced longitudinally from the ring 32, could be provided for the purpose of maintaining the axis of the secondary piston 30 parallel with the axis of the guideway 28.

The secondary piston 30 has a blind, coaxial, cylindrical recess 32 for receiving the bottom end of a compression coil spring 34, the upper end of which bears against a cylindrical magnetic pole piece 36, held in place with respect to the upper part of the piston guide 20. It will further be noted that the valve 10 includes a first flux washer 40 near the top, aligned with the magnetic pole piece 36, and also includes a second flux washer 42 located at a position spaced below the first flux washer 40. The space between the flux washers 40 and 42 receives a conventional cylindrical solenoid coil 44, which, as described below, is adapted to be energized either to a first predetermined level or to a second predetermined level.

The secondary piston 30 includes a cylindrical portion 46 which projects downwardly into the outlet passageway 14 when both of the pistons are at their respective lowermost positions. This causes a certain degree of occlusion of the passageway 14, but such occlusion is of no importance when the annular ring seal 24 (supported on the primary piston 22) is closed against the valve seat 16. This condition is shown in FIG. 1, which represents the situation when the solenoid coil 44 is not energized, thus allowing the compression coil spring 34 to push both of the pistons 22 and 30 to their respective lowermost positions, and closing the valve 10.

Figure 2:
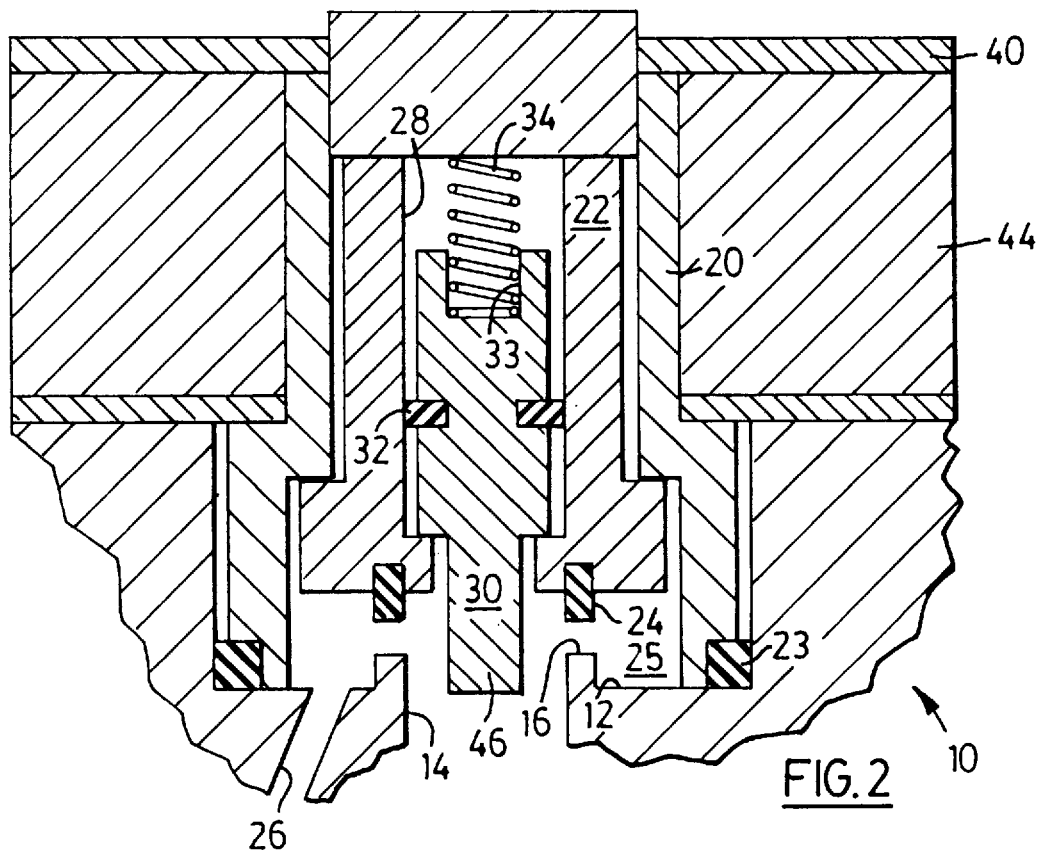

FIG. 2 shows the intermediate flow state, when the solenoid coil 44 is energized to said second predetermined level. This degree of energization is sufficient to raise the primary piston 22 to its uppermost position (in which it abuts the magnetic pole piece 36), but is insufficient to raise the secondary piston 30 as well. In consequence, the downwardly projecting cylindrical portion 46 of the secondary piston 30 still projects part-way into the outlet passageway 14, such that it partially occludes the opening, thus partially limiting the flow of fluid through the valve.

Figure 3:
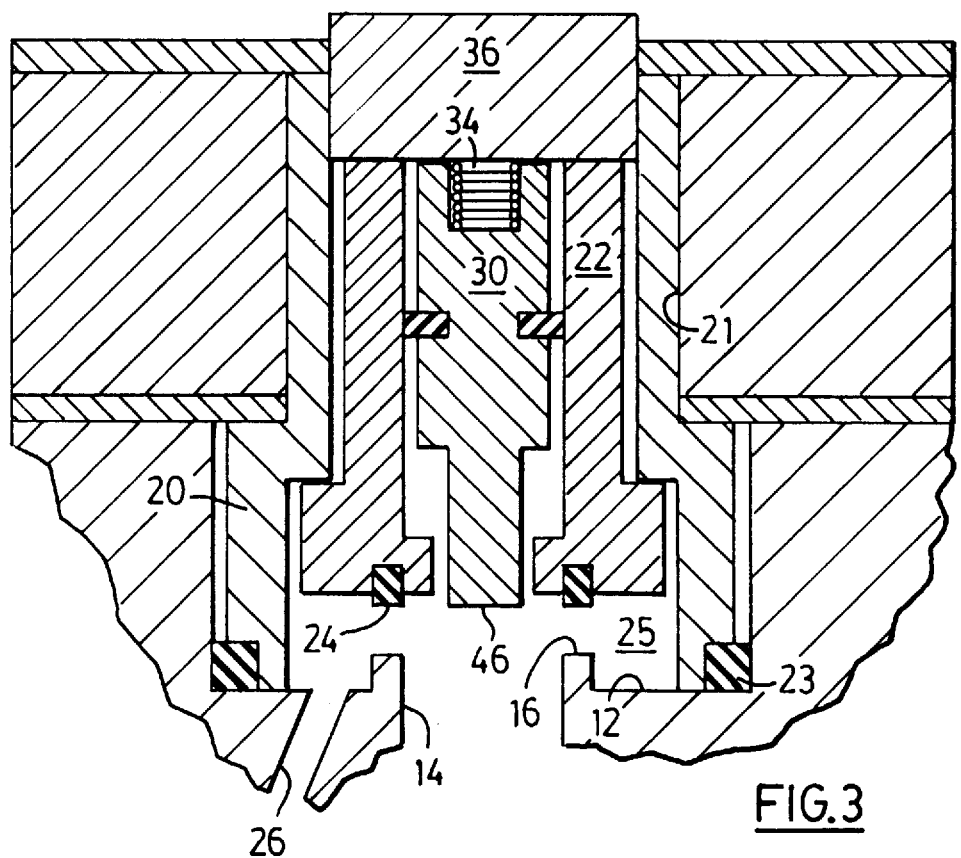

FIG. 3 shows the fully open position of the valve, in which the solenoid coil 44 is energized to said first predetermined level, producing a magnetic flux which is sufficient to raise both the primary and the secondary pistons 22 and 30 to their uppermost positions, defined by abutment between both pistons 22 and 30 and the magnetic pole piece 36. In this condition (wherein both pistons are at their second positions) the downwardly projecting cylindrical portion 46 of the secondary piston 30 no longer projects into the outlet (passageway 14), and thus does not interfere with fluid flow through the valve.

As a non-limiting example, if the diameter of the downwardly projecting cylindrical portion 46 of the secondary piston 30 were 0.707 of the diameter of the passageway 14, the opening would be approximately 50% occluded, and would provide approximately 50% of the orifice's nominal flow.

While one embodiment of this invention has been illustrated in the accompanying drawings and described hereinabove, it will be evident to those skilled in the art that changes and modifications may be made therein, without departing from the essence of this invention, as set forth in the appended claims.

The embodiments of the invention in which an exclusive property or privilege is claimed are defined as follows:

1. A tri-stable solenoid-operated valve, comprising:

a) body means defining an internal chamber, b) an outlet passageway leading away from the chamber, c) a valve seat surrounding the outlet passageway, d) a primary piston mounted within the chamber for reciprocating movement toward and away from said valve seat, between a first and a second position, e) closure means supported by said primary piston, the closure means being adapted to close against said valve seat when the primary piston is at its first position, and to be spaced away from the valve seat when the primary piston is at its second position, f) an inlet passageway opening into said chamber such that it is denied communication with said outlet passageway when the primary piston is at its first position, and is in communication with said outlet passageway when the primary piston is at its second position, g) a secondary piston mounted to the primary piston for reciprocating movement with respect thereto between a first and a second position, the secondary piston having a portion which projects into the outlet passageway to cause the outlet passageway to be occluded to a predetermined degree when the primary piston is at its second position and the secondary piston is at its first position; said portion of said secondary piston causing the outlet passageway to be occluded to a degree less than said predetermined degree when both the primary and secondary pistons are at their respective second positions, h) biasing means urging both said pistons toward their respective first positions, i) solenoid means which, when energized to a first predetermined level, overcomes said biasing means to move both pistons to their respective second positions, and which, when energized to a second predetermined level lower than said first predetermined level, partly overcomes said biasing means to move only the primary piston to its second position, whereby the lower energization of said solenoid causes the valve seat to be opened to a degree intermediate between closure and that achieved by the first level of energization.

2. The valve claimed in claim 1, in which, when both the primary and secondary pistons are at their respective second positions, the outlet passageway is substantially fully open.

3. The valve claimed in claim 2, in which the valve seat, both pistons and the closure means are all bodies of revolution and are all substantially coaxial.

4. The valve claimed in claim 1, in which both pistons are substantially entirely of a ferro-magnetic material.

5. The valve claimed in claim 1, in which said internal chamber is partly defined by a cylindrical, internal guideway provided by a piston guide lodged within said recess.

6. The valve claimed in claim 1, in which said biasing means is constituted by a coil spring urging the secondary piston, and through it the primary piston, toward their respective first positions.

* * * * *